United States Patent
Kakas et al.

(10) Patent No.: US 12,448,037 B2
(45) Date of Patent: Oct. 21, 2025

(54) METHOD FOR CONTROLLING A STEER-BY-WIRE STEERING SYSTEM OF A ROAD VEHICLE WITH GARAGE MODE

(71) Applicants: thyssenkrupp Presta AG, Eschen (LI); Honda Motor Co., Ltd., Tokyo (JP)

(72) Inventors: Péter Kakas, Budapest (HU); Imre Szepessy, Mauren (LI); Hayato Miyakawa, Wako (JP); Satoshi Nakahara, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 18/612,485

(22) Filed: Mar. 21, 2024

(65) Prior Publication Data
US 2024/0227933 A1    Jul. 11, 2024

Related U.S. Application Data

(63) Continuation of application No. PCT/EP2021/076005, filed on Sep. 22, 2021.

(51) Int. Cl.
    *B62D 6/00* (2006.01)
(52) U.S. Cl.
    CPC .................... *B62D 6/008* (2013.01)
(58) Field of Classification Search
    CPC ...... B62D 6/008; B62D 6/002; B62D 15/025; B62D 5/001; B62D 6/001
    See application file for complete search history.

(56) References Cited

U.S. PATENT DOCUMENTS

| | | | |
|---|---|---|---|
| 2019/0367084 A1 | 12/2019 | Hong | |
| 2020/0023889 A1* | 1/2020 | Rohrmoser | B62D 5/0463 |
| 2020/0108866 A1* | 4/2020 | Lapis | B62D 9/002 |
| 2020/0398891 A1* | 12/2020 | Szepessy | B62D 15/021 |

FOREIGN PATENT DOCUMENTS

| | | |
|---|---|---|
| DE | 10 2017 217 581 A1 | 4/2019 |
| JP | 2008-137413 A | 6/2008 |

OTHER PUBLICATIONS

Official Communication issued in International Patent Application No. PCT/EP2021/076005, mailed on Jun. 17, 2022.

* cited by examiner

*Primary Examiner* — Phutthiwat Wongwian
(74) *Attorney, Agent, or Firm* — Keating & Bennett, LLP

(57) ABSTRACT

A method to control a steer-by-wire steering system of a road vehicle including a feedback actuator, a road wheel actuator, and a controller configured or programmed to control the feedback actuator and the road wheel actuator, and the method includes, upon external request to the controller, providing a garage mode of the steer-by-wire system, switching off the feedback actuator, depending on the external request, moving to a predetermined position or moving from a first end position to a second end position of the road wheel actuator or fixing a position of the road wheel actuator at a last position or a center position, and, after the garage mode is terminated, returning the road wheel actuator to an original position before the garage mode was entered into and switching on the feedback actuator.

7 Claims, 2 Drawing Sheets

METHOD FOR CONTROLLING A STEER-BY-WIRE STEERING SYSTEM OF A ROAD VEHICLE WITH GARAGE MODE

CROSS REFERENCE TO RELATED APPLICATIONS

This application claims the benefit of priority to PCT Application No. PCT/EP2021/076005 filed on Sep. 22, 2021. The entire contents of this application is hereby incorporated herein by reference.

BACKGROUND OF THE INVENTION

1. Field of the Invention

The present invention relates to methods to control steer-by-wire steering systems of road vehicles.

2. Description of the Related Art

Steer-by-wire steering systems have no mechanical coupling between the steering wheel and the road wheels, and include a feedback actuator for applying a feedback torque to a steering wheel and a road wheel actuator for turning of the steerable road wheels.

Vehicle steering has traditionally included adjusting the vehicle wheels' toe angle during maintenance of a vehicle. In this case, steer-by-wire technologies provide new possibilities. But steer-by-wire technologies also possess difficulties for example with respect to calibration and towage.

SUMMARY OF THE INVENTION

Example embodiments of the present invention provide methods for controlling steer-by-wire steering systems of road vehicles to handle the above-described situations.

A method for controlling a steer-by-wire steering system of a road vehicle including a feedback actuator, a road wheel actuator, and a controller configured or programmed to control the feedback actuator and the road wheel actuator, and the method includes, upon external request to the controller, providing a garage mode of the steer-by-wire steering system, switching off the feedback actuator, depending on the external request, moving to a predetermined position or moving from a first end position to a second end position of the road wheel actuator or fixing a position of the road wheel actuator at a last position or a center position, and after the garage mode is terminated, returning the road wheel actuator to an original position before the garage mode was entered into and switching on the feedback actuator.

The garage mode allows for handling of maintenance or other special situations like calibration and towage.

Preferably, the external request is transmitted through vehicle communication.

The external request can be sent from an external device outside the vehicle or from another controller within the vehicle.

In one example embodiment, the external request includes a request for a toe angle adjustment, and in the moving step, the road wheel actuator is fixed at a center position.

It is also possible that the external request includes a request for a road wheel actuator position, and in the moving step, the road wheel actuator is moved from a first end position to a second end position and back to an original position.

Further, the external request can include a request for towage, and in the moving step, the road wheel actuator position is fixed in the last position or at the center position.

Additionally, a steer-by-wire steering system for a road vehicle with a controller configured or programmed to perform the method described above is provided.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will now be described with reference to the drawings.

DETAILED DESCRIPTION OF THE EXAMPLE EMBODIMENTS

Figure 1:
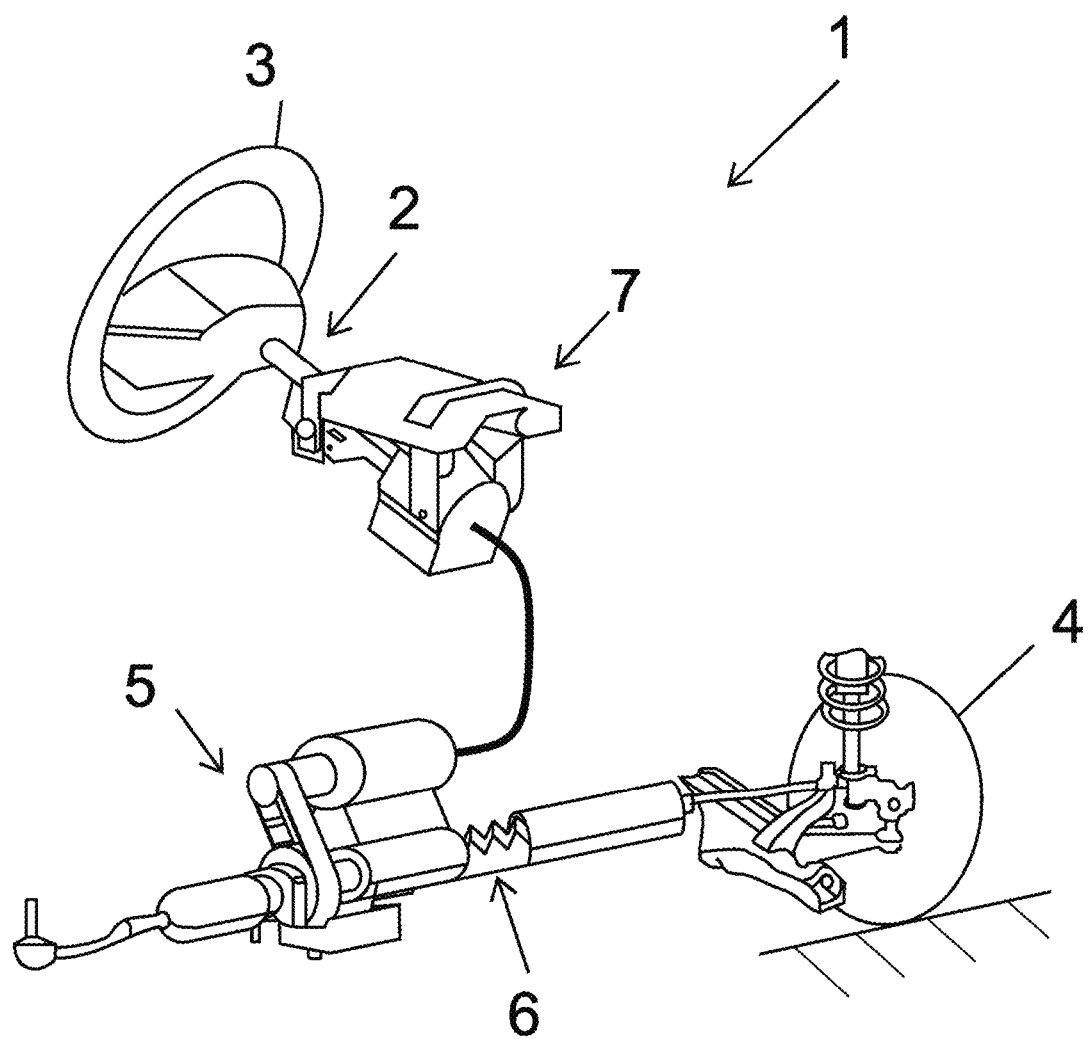
FIG. 1 is a schematic view of a steer-by-wire-steering system.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a recirculating ball gear.

When a driver operates the steering wheel 3, the steering shaft 2 is rotated, which is detected by a shaft sensor, which is not shown in the drawings. A controller is configured or programmed to calculate an operation signal for the road wheel actuator 5 from the signal detected by the shaft sensor. By operating gear rack 6 with the operation signal, the road wheels 4 are turned. At the same time, forces introduced in the gear rack 6 from the road wheels 4 are recognized by another sensor not shown in the drawings, and a feedback signal is calculated, which is applied to the steering shaft 2 by a steering wheel actuator 7, also called a feedback actuator, so that the operator can recognize the feedback in the steering wheel 3.

According to an example embodiment of the present invention, the steer-by-wire steering system 1 has a garage mode for maintenance and/or special use cases. Special use cases can include toe adjustment, road wheel actuator end lock position calibration, towage and so on.

Figure 2:
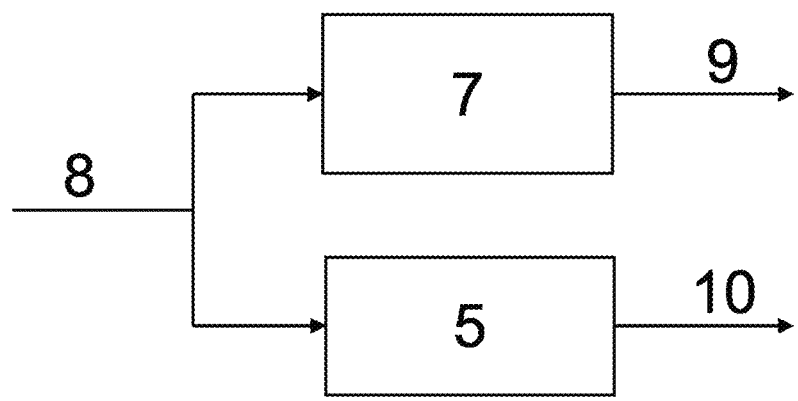
FIG. 2 is a block diagram representing a garage mode of the steering system.

As shown in FIG. 2, there is an external garage mode request 8 send to a controller of the steering system. The external request can be transmitted through vehicle communication, e.g., OBD, CAN, Flexray, Ethernet or any other. It is possible that the request is sent from an external device outside the vehicle or from another controller within the vehicle. In response to the request, the feedback actuator 7 is switched off 9. The road wheel actuator 5 remains fully functional 10.

The garage mode allows for toe angle adjustment. When the road wheel actuator is in a neutral position, the vehicle should move straight ahead. However, when assembling the axle or during the lifetime of the vehicle, the left and right wheels may aim in a direction that is not straight forward. This can lead to side slipping.

For toe angle adjustment, the road wheel actuator is fixed at a center position.

Further, the garage mode allows for road wheel actuator position calibration, during which the road wheel actuator is moved from a first end position to a second end position and back to an original position. The first or second end position is preferably defined by the end stop positions of the road wheel actuator.

For other special use cases like towage, the garage mode allows the road wheel actuator position to be fixed in the last position or at the center position according to an external request send to the controller. In a case that the road wheel actuator is requested to changes its position, this is done following a target position via a request message.

After the garage mode is finished, the road wheel actuator is moved gradually back to an original position it was in before the system entered into this special mode and the feedback actuator is switched back on.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steer-by-wire steering system of a road vehicle including a feedback actuator, a road wheel actuator, and a controller configured or programmed to control the feedback actuator and the road wheel actuator, the method comprising:
   upon external request to the controller, providing a garage mode of the steer-by-wire steering system;
   switching off the feedback actuator;
   depending on the external request, moving to a predetermined position or moving from a first end position to a second end position of the road wheel actuator or fixing a position of the road wheel actuator at a last position or a center position; and
   after the garage mode is terminated, returning the road wheel actuator to an original position before the garage mode was entered into and switching on the feedback actuator.

2. The method according to claim 1, wherein the external request is transmitted through vehicle communication.

3. The method according to claim 1, wherein the external request is sent from an external device outside the vehicle or from another controller within the vehicle.

4. The method according to claim 1, wherein the external request includes a request for toe angle adjustment, and in the moving step, the road wheel actuator is fixed at a center position.

5. The method according to claim 1, wherein the external request includes a request for road wheel actuator position, and in the moving step, the road wheel actuator is moved from one end position to another end position and back to the original position.

6. The method according to claim 1, wherein the external request includes a request for towage, and in the moving step, the road wheel actuator position is fixed in the last position or at the center position.

7. A steer-by-wire steering system for a road vehicle with a controller configured or programmed to perform the method according to claim 1.

* * * * *